Figure 1:
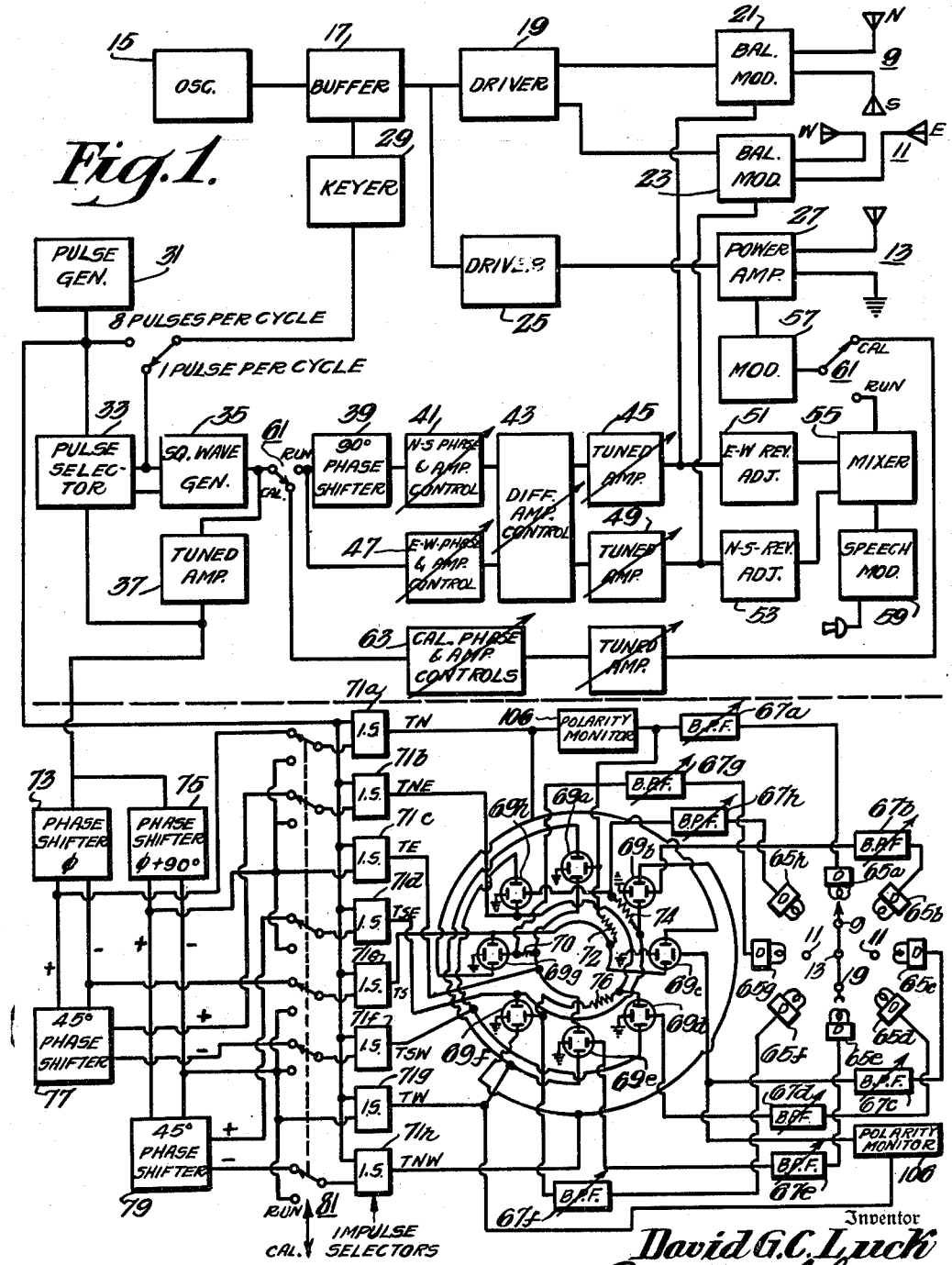

Nov. 3, 1942.  D. G. C. LUCK  2,300,581
MONITORING SYSTEM
Filed Oct. 31, 1940  2 Sheets-Sheet 2
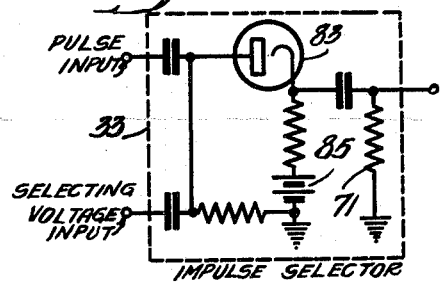
Fig. 2.
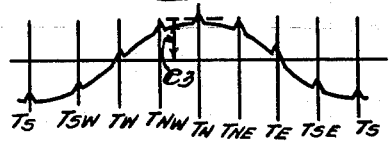
Fig. 3.
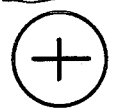 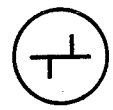  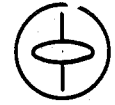 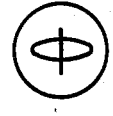
Fig. 4a.  Fig. 4b.  Fig. 4c.  Fig. 4d.  Fig. 4e.
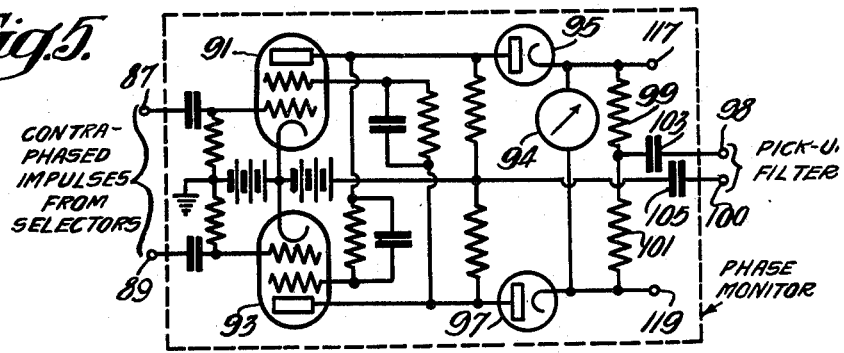
Fig. 5.
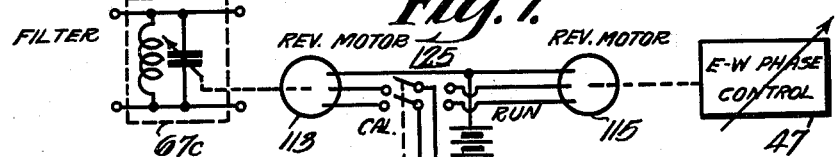
Fig. 7.
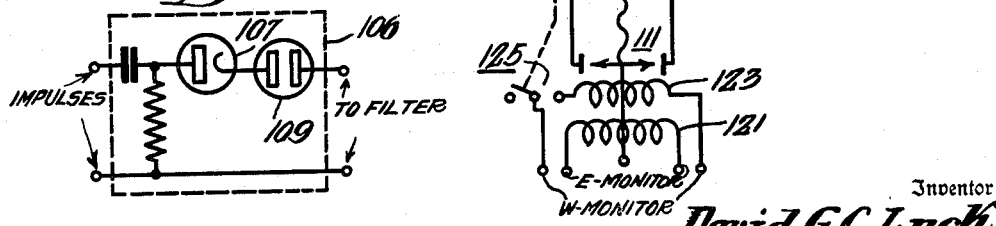
Fig. 6.
Inventor
David G. C. Luck
By
Attorney

Patented Nov. 3, 1942

2,300,581

UNITED STATES PATENT OFFICE 2,300,581

MONITORING SYSTEM

David G. C. Luck, Haddon Heights, N. J., assignor to Radio Corporation of America, a corporation of Delaware Application October 31, 1940, Serial No. 363,629

13 Claims. (Cl. 250—11)

This invention relates to omnidirectional ranges of the type originally described and claimed in my U. S. Patent 2,208,376, issued July 16, 1940, on an application filed July 28, 1937, a modification of which is described and claimed in my copending application Serial No. 363,249, filed October 29, 1940. Specifically, this invention is a monitoring method and system for an omnidirectional rotating radio range which makes possible the accurate adjustment of the phase of the rotating directional radio beacon with respect to a fixed reference or marker impulse since the actual phase may be observed.

In the patent referred to above, an omnidirectional radio range is described in which a pair of Adcock antennas radiating modulation side band energy and a centrally located non-directional antenna radiating carrier frequency energy are utilized to produce in a horizontal plane a limacoid, or roughly cardioid-shaped, radiation field which rotates at the modulation frequency. The field is keyed off once per revolution, when the cardioid is pointing due north, for example, to provide a reference or timing mark. A receiver located at a distance from the transmitter receives a modulated signal which passes through maximum and minimum as the field rotates to produce a sine wave output voltage corresponding to the instantaneous field intensity. The phase of this output voltage, with respect to the timing impulse, depends upon the position of the receiver with respect to the transmitter, as is well known. The receiver may utilize any convenient method of indicating the phase of the two received voltages, but a cathode ray indicator is preferred.

Since the position of a receiver with respect to the transmitter is determined by the phase of the rotating field, it will be recognized that the phase of the field must be accurately controlled and monitored at a plurality of points. The mere fact that the maximum of the rotating cardioid reaches due south exactly a half period after the occurrence of the north-marking impulse is not sufficient to assure correct timing east or west, or at any intermediate point. As a matter of fact, I have found that slight differences and dissymmetries in the transmitter and antenna circuits tend to distort the normally constant speed of rotation, although the average speed may be constant. Accordingly, my copending application, referred to above, describes a system for controlling the phase of the radiated field at the cardinal compass points north, east, south and west, and for adjusting the average error in the intercardinal points north-east, south-east, south-west, and north-west. But such controls are useful only if means is provided for indicating the actual time phase at the various points. Previous monitoring systems measure directly the relative phases of the currents in the transmitter and antenna system, but this is only an indirect measurement of the properties of the radiated field; it is, therefore, the principal object of this invention to provide a method of and means for directly monitoring the characteristics of the radiated field.

It is known that where a cathode ray indicator is utilized, the electron beam is caused to rotate in synchronism with the rotating field, the beam rotation being synchronized by the received signal modulation produced by the field rotation. For calibrating such a receiver, using signals radiated by the range, it has been proposed to transmit a special "calibrating" signal having no directional properties which includes a sine wave modulation corresponding in phase to that which would be received on a line due north of the transmitter, and a plurality of reference impulses separated by equal time intervals, and transmitted at a rate of, say, eight impulses per cycle of the calibrating modulation. The indicator being calibrated is then adjusted so that the eight equally spaced marks appear on the cathode ray screen at points corresponding to the four cardinal and the four inter-cardinal points of the compass. This calibration depends for its accuracy upon the maintenance of exactly equal time intervals between successive calibrating impulses. In accordance with a further object of this invention, a system is proposed which is independent of timing errors in the calibrating impulses. Briefly, this is accomplished by utilizing the eight impulses generated for receiver calibration to monitor the phase of the radiated field at points spaced from the transmitter in the four cardinal and the four inter-cardinal directions. As a result, if one of the calibrating impulses, say east, occurs too soon, the calibrating error in the receiver will be compensated by the corresponding transmitter adjustment. That is, the phase of the cardioid in the east direction will be adjusted by the monitor against the same calibrating mark so that the field maximum is advanced in time by the amount of the calibrating error. The errors therefore cancel, and the system as a whole is free from difficulty due to uneven timing of the receiver calibrating impulses. Other objects of this invention include the provision of an improved monitoring system for omnidirectional radio ranges; the provision of means for monitoring the radiated field of a radio range, and the provision of a system for maintaining automatically a radio range in proper adjustment.

Briefly, the above objects are accomplished by deriving monitoring signals from shielded pickup and rectifier units placed accurately on the cardinal and inter-cardinal radials from the center of the antenna system, located far enough from the center of the antenna array to receive predominately radiated fields, but close enough to avoid the effects of obstacles in the vicinity. Monitoring is then accomplished by comparing the phases of the modulation frequency outputs of the pickup and rectifier units with impulses selected from the eight-per-cycle calibrating impulses.

This invention will be better understood from the following description when considered in connection with the accompanying drawings. Its scope is indicated by the appended claims. Similar reference numerals refer to similar elements throughout the several figures of the drawings.

Referring to the drawings, Fig. 1 is a schematic diagram, partly in block-diagram, of an embodiment of this invention; Fig. 2 is a schematic diagram of an impulse selector; Fig. 3 is a graph illustrating the operation of an impulse selector; Figs. 4a to 4e are drawings representing indications produced on a cathode ray screen; Fig. 5 is a circuit diagram of a phase monitor; Fig. 6 is the circuit diagram of a polarity monitor; and Fig. 7 is the circuit diagram of an automatic control unit.

*Omnidirectional range transmitter*

The portion of Fig. 1 above the dotted line is an omnidirectional radio range transmitter having means for controlling the phase of the rotating field in various directions from the antenna, as described in detail in my copending application referred to above. Each of the elements indicated herein in block-diagram form is either an element well known to those skilled in the art or is shown in detail in my copending application or in the present application. Briefly, the system includes a pair of north-south directional aerials 9, a pair of east-west directional aerials 11, and a centrally located aerial 13, the latter having a circular radiation pattern. The two pairs of directional aerials are energized from a source 15 through buffer and driver amplifiers 17 and 19, and balanced modulators 21 and 23. The central antenna is energized with carrier frequency energy from source 15 through a driver 25 and a power amplifier 27. A keyer 29 connected between the buffer 17 and a pulse generator 31 keys or momentarily interrupts the radiations at predetermined time intervals to establish reference or timing impulses.

The pulse generator 31 also supplies energy to a pulse selector 33 whose function is to select every eighth pulse from the pulse generator, and to utilize the selected pulses to drive a square wave generator 35 at modulation frequency. The fundamental frequency of the square wave generator is such that each cycle includes eight pulses. The pulse selector 33 is operated by a sine wave voltage of modulation frequency which may be derived from a tuned amplifier 37 coupled to the square wave generator.

During normal operation the square wave generator output is applied to the balanced modulators 21 and 23 through two channels, respectively. The first channel includes a 90° phase shifter 39, north-south phase and amplitude controls 41, differential amplitude control 43 and tuned amplifier 45. The second channel includes east-west phase and amplitude controls 47, the differential amplitude control 43 and a tuned amplifier 49. These channels apply modulation frequency voltages in relative phase quadrature to the balanced modulators. During normal operation the central antenna currents are modulated by voltages of controllable amplitudes corresponding to the phases of the east-west modulating voltage and the north-south modulating voltage by means of the appropriately labeled "reversible adjusters" 51 and 53 coupled between the two modulation frequency channels and a mixer 55 which is coupled to a modulator 57. Speech modulation may also be impressed on the central antenna from a source 59.

In the calibrate position, input to the balanced modulators is disconnected by switch 61, and the central antenna modulated with a sine wave voltage of modulation frequency derived from the square wave generator and adjusted by calibrating phase and amplitude controls 63. The phase of this modulation is preferably made to coincide with the phase of the rotating field taken from a point due north of the antennas.

For a detailed description of these elements, and an explanation of their function in adjusting the phase of the rotating field along the four cardinal and the four intercardinal radials from the transmitter, reference is made to my copending application.

*Monitor*

The monitor system comprises eight pickup and detector elements 65a to 65f, located at convenient points on equally spaced radials about the antenna system. The actual relative positions of the antennae 9, 11 and 13 of the array are clearly shown in this portion of the drawing. It is to be understood, of course, that these are the same antenna elements that appear in the upper portion of the drawing.

The pick-up detector elements are, for example, small loop antennas and crystal or thermionic detectors, suitably filtered, located north, south, east and west of the central antenna, and at the intermediate points northeast, southeast, southwest and northwest. These detectors produce modulation frequency output voltages whose relative phases are determined by the phase of the rotating field measured in the various directions. While the output circuits have been indicated by a single line, it is to be understood that this line represents either a two line connection, or a single line and ground connection, as is well known. To eliminate the timing pulse and possible modulation harmonics, each pick-up and detector unit is connected to one of eight filters 67a to 67h and then connects to the horizontal deflecting electrodes of the correspondingly lettered cathode ray phase indicator tubes 69a to 69h. The filters 67 are tuned to, and pass essentially only, the modulation frequency, and may comprise any preferred type of network, such as a simple shunt resonant circuit, or the like. The filters are adjustable so that the phase shift produced in each line may be controlled within limits.

The upper and lower vertical deflecting electrodes of diagonally opposite cathode ray tubes are cross-connected. In addition the eight interconnecting leads are connected to the output terminals of eight impulse selectors 71a to 71h, but the connections are offset 90° for a reason which will become apparent subsequently. Thus, impulse selector 71a is connected to the lower vertical deflecting electrode of cathode ray 69g and the upper deflecting electrode of cathode ray 69c; impulse selector 71b is connected to the lower electrode of cathode ray 69h and the upper electrode of cathode ray 69d; impulse selector 71c is connected to the lower electrode of cathode ray 69a and the upper deflecting electrode of cathode ray 69e, and so on.

Each impulse selector is provided with input terminals for the application of two separate voltages. The impulse output of the pulse generator 31 is applied to one terminal of each impulse selector. Sine wave control voltages of modulation frequency whose phases differ by an eighth cycle, or 45°, are applied to the remaining input terminals of the impulse selectors, respectively. These voltages are derived from the tuned amplifier 37, or any other source of modulation frequency voltage, and applied to a network of phase shifting elements. Thus, the voltage is first applied to two adjustable phase shifters 73 and 75. The phase shift $\phi$ produced by the first shifter 73 is adjusted so that the impulse selector 71a, to which it is connected, selects the North marking pulse, which is selected by pulse selector 33. Phase shifter 75 produces a delay equal to $\phi + 90°$. The outputs of these phase shifters are again delayed by a pair of 45° phase shifters 77 and 79. The plus and minus signs on the leads interconnecting the phase shifters indicate that these are push-pull leads, that is, balanced with respect to ground. Consequently contraphased voltages are available on the two leads in each case. Eight separate voltages are available, therefore. The voltage of phase $\phi$ is applied to impulse selector 71a; $\phi + 45°$ is applied to impulse selector 71b; $\phi + 90°$ to impulse selector 71c; and so on.

The input circuits of the impulse selectors also include a multi-element run-calibrate switch 81. The above connections are made in the "run" position of all elements of the switch. In the "calibrate" position voltage of a phase $\phi + 90°$ is applied to impulse selectors 71a to 71d, and voltage of a phase $\phi + 270°$ is applied to impulse selectors 71e to 71h.

Referring to Figs. 2 and 3, the circuit diagram of an impulse selector and a curve illustrating its function are shown. The impulse selector is simply a biased rectifier, such as a diode 83. Impulse input from the pulse generator and the control sine wave voltage of proper phase being coupled to the anode electrode. A fixed negative bias $e_3$ is also applied to the anode by means of a battery 85. The amplitude of this bias is, as illustrated in Fig. 3, slightly greater than the peak amplitude of the sine wave so that the tube remains non-conductive so far as the sine wave input alone is concerned. The sine wave amplitude is of the order of four times the amplitude of the applied pulses. Consequently, the only impulse which passes through the tube is the one coinciding with the positive peak of the sine wave. As its name implies, the impulse selector, therefore, selects every eighth pulse, or one per cycle of the modulation frequency. It will be observed that one pulse must coincide with the peak of the sine wave since the same sine wave output from amplifier 37 is used to control the impulse selector 33 which operates the square wave generator 35, which in turn drives the amplifier 37.

Returning now to Fig. 1, it becomes evident that the eight impulse selectors select successive pulses separated in time by an eighth cycle of the modulating frequency. The pulse selected by selector 71a is the marking pulse which occurs at a time $T_N$ during the positive peak of the modulation frequency voltage derived from the north pick-up 65a. The peak of the north-east pick-up voltage occurs at a time $T_{NE}$ which is 45° later, and coincides with the impulse from selector 71b; and so on. It is to be noted that for any given cathode ray tube, two deflecting impulses are oppositely applied at half period intervals. Considering the north cathode ray 69a, for example, the beam will be deflected downwards at a time $T_E$ by the impulse selector 71c and upwards by the impulse selector 71g at a time $T_W$, that is, 180° later. From Fig. 3 it may be seen that at times $T_E$ and $T_W$, the sine wave voltage applied to the horizontal deflecting electrodes of the north cathode ray 69a is passing through zero. The resultant pattern on the screen is therefore similar to that illustrated in Fig. 4a. When everything is normal, the pattern on each of the other cathode ray tubes will be identical to this, since in each case the voltage from the associated pick-up is compared to impulses in phase quadrature therewith. Slight deviations in this phase relation, due to errors in the timing of the rotating cardioid, for example, cause the pattern to appear as in Figs. 4b or 4c, depending on the sense of the error. Thus each cathode ray monitors the phase of the radiation in one of the cardinal or intercardinal directions.

It will be noted that there is an 180° ambiguity in the indications produced in Figs. 4a to 4e. That is, it is impossible to tell whether the upward impulse occurs as the horizontal deflecting sine wave voltage is approaching maximum, or has passed maximum. In order to resolve this ambiguity and establish the exact phasal relation between the selected impulses and the pick-up output, a small amount of sine wave voltage may be applied to one, or both, vertical deflecting electrodes of each cathode ray tube, the voltage being in quadrature with the modulation frequency sine wave applied to the horizontal deflecting electrodes. This may be done by interconnecting horizontal and vertical deflecting electrodes with suitable phase shifting networks, or by applying to one, or both, vertical deflecting electrode, a voltage of proper phase derived from a pick-up and detector unit whose output is in phase quadrature with the horizontal deflecting voltage of the indicator in question. For example, the south electrode of indicator 69a is coupled to the east electrode of indicator 69g by a resistor 70. The other indicators are similarly interconnected by resistors 72, 74 and 76. These quadrature voltages applied to the vertical deflecting circuits of the cathode ray tubes give a pattern of the type illustrated in Figs. 4d and 4e. Either pattern may be taken as standard, and the filters always adjusted to give the standard pattern. When side bands and carrier are radiated separately, as they are here, reversing the radio frequency phase of one reverses the phase of modulation. The transmitter circuits must be tuned so that the radio frequency currents in the directional antennas 9 and 11 are, say, 90° ahead of the radio frequency carrier currents in the omni-directional antenna 13. Some of this phase shift may be obtained by differences in the relative lengths of the transmission lines. The cascaded amplifier stages of the radio frequency transmitter are then adjusted on one side of resonance or the other until the desired relation is obtained in the antenna. A departure from this condition which produces a shift in phase in one of the circuits will then be indicated by a change in the width of the cathode ray pattern, since the maximum width is obtained when the required quadrature relation exists, provided the change in amplitude of the radiated signal, due to the mistuning, is small. As is well known, the phase of the output of a resonant circuit may be varied gradually between plus and minus 90° of the value at resonance. Tuning the radio frequency circuits of the transmitter slightly to one side or the other of resonance will, therefore, reverse the phase of modulation at the pick-up points. Thus, the four quadrant monitors may be used to monitor the phase relations of the radio frequency antenna currents.

*Calibration of the monitor*

To calibrate the monitor, the transmitter and monitor calibrate switches 61 and 81 are both placed in the "calibrate" position. At the transmitter the rotating field is replaced by a uniform field modulated at rotation frequency, and interrupted once per cycle at approximately the maximum field intensity. The first step is to tune filter 67a to the modulation frequency to minimize phase shift in the filter. This may be done by any conventional means, as, for example, by connecting the horizontal deflecting plate of a cathode ray tube to the input of the filter and the vertical plates to the output, or vice versa, the condition for minimum phase shift being indicated by the filter adjustment which most nearly produces a straight line. The second step is to adjust the "calibrate phase control" 63 of the transmitter until the two vertical lines on the north cathode ray 69a coincide, as shown in Fig. 4a. It will then be known that the peak of the modulated wave coincides with the occurrence of the north marking impulse. The final step is to adjust all the remaining filters 67b to 67h to give the correct pattern, Fig. 4a, on the corresponding cathode ray tubes. The calibration amplitude control in element 63 is also set to give the desired modulation depth. Upon changing the switches to the "run" position the various cathode ray tubes indicate the phase of the rotating field in the corresponding directions. It is unlikely that these will all be correct at first, but they may then be adjusted at the transmitter.

*Use of monitor in adjusting phase of rotating field*

Adjustment of the north-south modulation phase by means of the N.—S. phase control 41 will shift the indications of 69a and 69e in the same direction, while adjustment of the non-directive antenna modulation by the N.—S. reversible adjuster will shift the phase at indicators 69a and 69e in opposite directions. Thus both north and south radiation may be given the correct phasing by cooperative adjustment of both controls. Similarly, adjustment of the east-west modulation phase by means of the E.—W. phase control 47 will shift the indications of 69c and 69g in the same direction, without disturbing the north-south adjustment, and adjustment of the E.—W. reversible adjuster will shift the phases indicated by the tubes 69c and 69g in opposite directions. Thus the east and west radiation is given the correct phasing. By means of the differential amplitude control 43 the average error in the four intercardinal directions may be minimized, the best position being indicated by reference to the four indicators 69b, 69d, 69f, and 69h. The amplitude control portions of the elements 41 and 47 are adjusted to give the same modulation depth as in the "calibrate" position, as indicated by equal widths of the cathode ray patterns for both positions of the "run-calibrate" switch. The function of these controls in making the above adjustments is described fully in my copending application.

*Alternative embodiments*

The cathode ray phase indicator may be replaced by other well known types of phase indicators such as the co-planar grid phase indicator disclosed in Patent No. 2,223,840, issued December 3, 1940, to I. Wolff on an application Serial No. 203,358, filed April 21, 1938. To overcome the poor sensitivity of such a system caused by the short impulses and high ratio of peak to average current, I propose to apply impulses from selectors 71a and 71e, 180° apart, to a non-self-oscillating square wave generator or direct current multivibrator to produce a square or sine wave output rigidly synchronized by the impulses, and utilize this synchronized voltage to check the phase of the voltage from the pickup-devices. Such an arrangement is illlustrated in Fig. 5, to which reference is now made.

Contraphased impulses from the proper selectors are applied to input terminals 87, 89. The impulses are applied to the control grids of a pair of multi-grid tubes 91, 93. The second or screen grids and anodes of the tubes are interconnected in a multivibrator circuit so that the tubes alternately saturate in exact synchronism with the applied impulses. A D.—C. meter 94 is differentially connected to the multivibrator through a pair of rectifiers 95, 97. Input from the proper filter is coupled to terminals 98, 100 and is applied between the mid-point of a pair of resistors 99, 101 connected across the meter and the B+ supply for the tubes 91, 93. Blocking capacitors 103, 105 are included in these circuits.

The average D.—C. current through the meter 94 from the square wave generator is zero. When the input from the pick-up is in phase quadrature with this square voltage, the D.—C. current is still zero. But when the phase of the applied currents shifts from this relation, the currents add more in one half of the cycle than they subtract in the other half of the cycle, and a resultant D.—C. current flows through the meter. One of these phase indicators is used in place of each cathode ray indicator, if desired, the only change in wiring necessary being the substitution of the input terminals 87, 89 for the vertical deflecting electrode connections, and the input terminals 98, 100 for the horizontal deflecting electrode connections, in each case. Eight such phase indicators will be required.

The meter phase monitor, like the cathode ray indicator producing the traces of the type illustrated in Figs. 4a to 4c, does not indicate the actual phase angle. To resolve this ambiguity, a simple polarity monitor 106 illustrated in Fig. 6 may be used. A rectifier 107 and a neon tube 109 are serially connected between the north filter 67a, for example, and the impulse selector supplying impulses of the same phase. Since the impulse is applied to one plate of the neon tube at the instant the other plate is at a similar potential, the neon tube will not light. If, however, the radio frequency circuits of the transmitter are incorrectly adjusted and the modulation phase reversed, the sine wave voltage will be opposite in polarity to the applied impulse, thus producing a voltage difference across the tube, causing it to light. Adjustments will then be made with the various meters to produce zero phase shift all around, making certain that the neon tubes do not light. Of course, the polarity monitor may also be connected so that the neon tube will light when the modulation phase is correct. A similar monitor is used to check the east-west polarity.

It is possible to adjust automatically the filters 67 to calibrate the monitor, and also to adjust automatically the transmitter controls which vary the phase of radiation in the four cardinal directions. The filter adjustment is made by means of a reversible motor geared to the tuning element of the filter, the direction of rotation of the motor being determined by a reversing relay connected in place of, or in parallel with, the meter 94 of each phase monitor except the north monitor, since the north filter 67a is tuned by other means, as indicated above. A similar relay in each of the east, south and west phase monitors, as well as a like relay connected to the north monitor, may be used to control the transmitter adjustment. For this purpose it is preferable to use a double wound relay, it being understood that one winding only need be used when switched to adjust the monitor filter. One such arrangement is illustrated in Fig. 7 for adjusting, say, the east filter 67c and the E.-W. phase control 47.

The relay 111 has two similar windings 121 and 123 which actuate an armature between two contacts, the normal position being midway between them, as indicated. In the "calibrate" position of switch 125, one winding is connected to terminals 117, 119, Fig. 5, of the east monitor and the relay then controls the direction of rotation of a reversible motor 113, which is geared to the east filter 67c. When the phase of the filter output is normal the average D.-C. current through meter 94, Fig. 5, and hence through relay 111 is zero, and the relay remains in its neutral position. If the filter adjustment is incorrect, current flows through the meter and the relay winding 121, and actuates the relay in a direction which causes the motor 113 to correct the error.

In the "run" position, the relay controls a second reversible motor 115 which is geared to the phase adjusting element of the E.-W. phase control 47. The control element shifts the east and west phases in the same direction, keeping the difference of the phases constant, and varying their sum. The two windings 121 and 123 of the relay are therefore connected to the east and west phase monitors, respectively, across the meters 94, so as to indicate the sum of the currents. Thus if the E.-W. phase control gets out of adjustment meters 94 in the east and west monitors will move in the same direction and the resulting currents will actuate the relay in the direction necessary to cause the motor 115 to retune the E.-W. phase control to the proper position. A similar arrangement will also be used to control the N.-S. phase control 41, the meter windings being connected across the indicating meters 94 of the north and south phase monitors. In this case, however, the "calibrate" unit will be connected to the south filter, and the winding used in the "calibrate" position connected to the south monitor.

It will be remembered that the N.-S. and E.-W. reversible adjusters 53 and 51 vary the north and south and the east and west phases, respectively, in opposite directions. That is, the sum of the phases remains constant, but their difference varies. To control these elements automatically, therefore, double wound relays are again used, the windings being connected to the north and south phase monitors and the east and west phase monitors so as to respond to changes in the difference of the output currents. The relay will then be unchanged by adjustments of the phase control elements 41 and 47, and will respond to and correct changes in the reversible adjusters.

I have thus described a visual and an automatic monitor for a rotating radio range. It will be appreciated that many variations in the specific embodiments described will occur to those skilled in the art, and that the monitor may also be used in connection with a radio range whose field is rotated by the physical rotation of the antenna system.

I claim as my invention:

1. In a radio range having means including an antenna for producing a rotating directional field and means for establishing marking impulses whereby the position of a receiver with respect to said antenna may be established by measuring the phase of radiation in any direction with respect to the phase of said marking impulses, means for monitoring the phase of said radiation field in selected directions, said means including a plurality of pick-up units spaced around said antenna, and a plurality of phase indicators coupled to said pick-up units and to said radio range for comparing the phase of currents from said pick-up units with respect to said marking impulses.

2. In a radio range having means including an antenna for producing a rotating directional field and means for modulating said field once per revolution to establish marking impulses, the method of monitoring at said range the phase of radiation in selected directions which includes the steps of receiving and demodulating said radiations at separate points to produce separate currents modulated at the frequency of rotation, and indicating the phases of said separate currents with respect to reference currents of known phase in relation to said marking impulses.

3. In a radio range having means including an antenna for producing a rotating directional field and means for modulating said field once per revolution to establish marking impulses, the method of monitoring at said range the phase of radiation in selected directions which includes the steps of receiving and demodulating said radiations at separate points to produce separate currents, modulated at the frequency of rotation, deriving reference impulses from said modulating means, and comparing the phase of said separate currents with respect to said reference impulses.

4. In a radio range having means including an antenna for producing a rotating directional field and means for modulating said field once per revolution to establish marking impulses, the method of monitoring the phase of radiation in selected directions which includes the steps of receiving and demodulating said radiations at separate points to produce separate currents modulated at the frequency of rotation, deriving reference impulses which bear a predetermined phasal relation to said marking impulses, and comparing the phase of said reference impulses and corresponding ones of said separate currents whereby deviations in the phase of rotation of said rotating field may be indicated.

5. In a radio range having means including an antenna for producing a rotating directional field and means including a pulse generator for modulating said field once per revolution to establish marking impulses, means for monitoring the phase of radiation of said rotating field in selected directions, said means including a plurality of pick-up and rectifier units located equidistantly from said antenna in said selected directions, means coupling said pick-up and rectifier units to a corresponding number of phase monitors, means for deriving spaced impulses from said pulse generator, and means for applying said spaced impulses to said phase monitors.

6. In a radio range having means including an antenna for producing a rotating directional field, a pulse generator for establishing spaced pulses whose frequency bears a fixed relation to the frequency of rotation of said field, and means for modulating said field once per revolution thereof by one of said pulses, the combination of a plurality of pick-up units located equidistantly from said antenna in selected directions, means for deriving rotation frequency currents from said units, the phases of said currents being proportional to the phase of radiation of said field in said directions, respectively, and means for comparing the phase of each of said derived currents and correspondingly phased ones of said spaced impulses.

7. A device of the character described in claim 6 in which said means for comparing the phase of each of said derived currents and correspondingly phased ones of said spaced impulses includes a plurality of cathode ray tubes having pairs of deflecting electrodes, means for applying said derived currents to one pair of deflecting electrodes of respective cathode ray tubes, and means for applying to the other pair of deflecting electrodes of each of said cathode ray tubes spaced impulses which are substantially in phase quadrature with the derived currents applied to the same tube.

8. A device of the character described in claim 6 in which said means for comparing the phase of each of said derived currents and correspondingly phased ones of said spaced impulses includes a plurality of cathode ray tubes having pairs of deflecting electrodes, means for applying said derived currents to the first pair of deflecting electrodes of each of said cathode ray tubes, respectively, means for applying to the second pair of deflecting electrodes of each of said cathode ray tubes spaced impulses which are phased substantially in quadrature with the derived currents applied to the first pair of deflecting electrodes of each tube, and means for determining the sense of said quadrature phased impulses.

9. A device of the character described in claim 6 in which said means for comparing the phase of each of said derived currents and correspondingly phased ones of said spaced impulses includes a plurality of cathode ray tubes having pairs of deflecting electrodes, means for applying said derived currents to one pair of deflecting electrodes of respective cathode ray tubes, means for applying to the other deflecting electrodes spaced impulses substantially in phase quadrature with the applied derived currents, and means for also applying to said other deflecting electrodes a voltage in phase quadrature with that applied to said one pair of deflecting electrodes for determining the sense of said derived currents with respect to said impulses.

10. In a radio range having means including an antenna for producing a rotating directional field, a pulse generator for establishing spaced pulses whose frequency bears a fixed relation to the frequency of rotation of said field, and means for modulating said field once per revolution thereof by one of said pulses, the combination of a plurality of field intensity responsive devices located equidistantly from said antenna in selected directions, means for deriving from each of said devices rotation frequency currents corresponding to the changing intensity of said rotating field in said directions, means for selecting successive ones of said impulses which are substantially in phase quadrature with respective derived rotation frequency currents, a plurality of phase indicators, means for applying said rotation frequency currents to respective phase indicators, and means for also applying said selected impulses to respective phase indicators.

11. A device of the character described in claim 10 in which said phase indicator is a cathode ray tube.

12. A device of the character described in claim 10 in which each of said phase indicators comprises means for deriving square wave oscillations synchronized by said selected impulse, and means for comparing the phase of said square wave oscillations and said rotation frequency currents.

13. A device of the character described in claim 10 in which each of said phase indicators comprises a multivibrator controlled by the applied selected impulses for producing a square wave current, and a meter responsive to changes in the phase of said applied rotation frequency current with respect to said square wave current.

DAVID G. C. LUCK.